(12) United States Patent
Seyedi et al.

(10) Patent No.: US 10,429,676 B2
(45) Date of Patent: Oct. 1, 2019

(54) RING WAVEGUIDE MODULATORS

(71) Applicant: HEWLETT PACKARD ENTERPRISE DEVELOPMENT LP, Houston, TX (US)

(72) Inventors: Mir Ashkan Seyedi, Palo Alto, CA (US); Chin-Hui Chen, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/745,712

(22) PCT Filed: Jul. 23, 2015

(86) PCT No.: PCT/US2015/041735
§ 371 (c)(1),
(2) Date: Jan. 17, 2018

(87) PCT Pub. No.: WO2017/014783
PCT Pub. Date: Jan. 26, 2017

(65) Prior Publication Data
US 2018/0210241 A1   Jul. 26, 2018

(51) Int. Cl.
  *G02F 1/01* (2006.01)
  *G02F 1/025* (2006.01)
  *G02B 6/287* (2006.01)

(52) U.S. Cl.
  CPC ........... *G02F 1/0147* (2013.01); *G02B 6/287* (2013.01); *G02F 1/025* (2013.01);
  (Continued)

(58) Field of Classification Search
  None
  See application file for complete search history.

(56) References Cited

U.S. PATENT DOCUMENTS 7,502,532 B2   3/2009   McCallion et al.
7,983,517 B1 *  7/2011   Watts ................. G02B 6/29335
                                              385/32
(Continued)

OTHER PUBLICATIONS

International Search Report & Written Opinion received in PCT Application No. PCT/US2015/041735, dated Apr. 21, 2016, 12 pages.

(Continued)

*Primary Examiner* — Michelle R Connelly
(74) *Attorney, Agent, or Firm* — Sheppard Mullin Richter & Hampton LLP

(57) ABSTRACT

In one example, a device includes a bus waveguide to carry a light of a carrier wavelength, a first ring waveguide with a first modulator, a first heater to adjust a resonance wavelength of the first ring waveguide, and a second ring waveguide with a second modulator. The first ring waveguide and the second ring waveguide are coupled to the bus waveguide and are to modulate the light of the carrier wavelength to impart one of at least four optical power levels to the light. In another example, a device includes, a bus waveguide, a first ring waveguide with a first modulator, and a second ring waveguide with a second modulator. The first ring waveguide and the second ring waveguide are coupled to the bus waveguide and are to modulate a light of a carrier wavelength to impart one of at least four optical power levels to the light.

13 Claims, 6 Drawing Sheets

(52) U.S. Cl.
CPC ...... *G02F 2201/16* (2013.01); *G02F 2201/17* (2013.01); *G02F 2203/05* (2013.01); *G02F 2203/15* (2013.01)

(56) References Cited

U.S. PATENT DOCUMENTS

| | | | |
|---|---|---|---|
| 8,582,937 | B2 | 11/2013 | Xu |
| 2006/0008223 | A1 | 1/2006 | Gunn et al. |
| 2008/0219614 | A1 | 9/2008 | Gill et al. |
| 2012/0243828 | A1 | 9/2012 | Suzuki |
| 2013/0037692 | A1* | 2/2013 | Akiyama ............ G02F 1/0115 250/201.1 |
| 2014/0023309 | A1 | 1/2014 | Jiang |
| 2014/0205289 | A1* | 7/2014 | Meade ............ H04Q 11/0005 398/48 |
| 2014/0321848 | A1 | 10/2014 | Sekiguchi |
| 2015/0049982 | A1 | 2/2015 | Qi et al. |
| 2015/0132015 | A1 | 5/2015 | Hayakawa |
| 2015/0277053 | A1* | 10/2015 | Zheng ............... G02B 6/29341 385/31 |

OTHER PUBLICATIONS

Li, Y. et al., "Coupled-ring-resonator-based Silicon Modulator for Enhanced Performance," Optics Express 16.17, Aug. 18, 2008, pp. 13342-13348, http://ieeexplore.ieee.org/stamp/stamp.jsp?tp=arnumber=6962040.

Samani A. et al., "OOK and PAM Optical Modulation Using a Single Drive Push Pull Silicon Mach-zehnder Modulator," Group IV Photonics (GFP), 2014 IEEE 11th International Conference, Aug. 27-29, 2014, pp. 45-46, http://ieeexplore.ieee.org/stamp/stamp.jsp?tp=&arnumber=6962040.

EPO; "EP Search Report" cited in Appl. No. 15899095.2 dated Oct. 19, 2018; 9 pages.

* cited by examiner

RING WAVEGUIDE MODULATORS

STATEMENT OF GOVERNMENT RIGHTS

This invention was made with Government support under Agreement No. H98230-14-3-0011. The Government has certain rights in this invention.

BACKGROUND

Various formats may be utilized for optical signal modulation in silicon photonics, including, return-to-zero (RZ) and non-return-to-zero (NRZ) on-off keying (OOK), RZ and NRZ differential phase shift keying (DPSK), quadrature phase shift keying (QPSK), and so forth. A four-level pulse amplitude modulation (PAM-4) format may also be utilized in complementary metal-oxide-semiconductor (CMOS) based integrated circuits for optical signal modulation.

DETAILED DESCRIPTION

Figure 1:
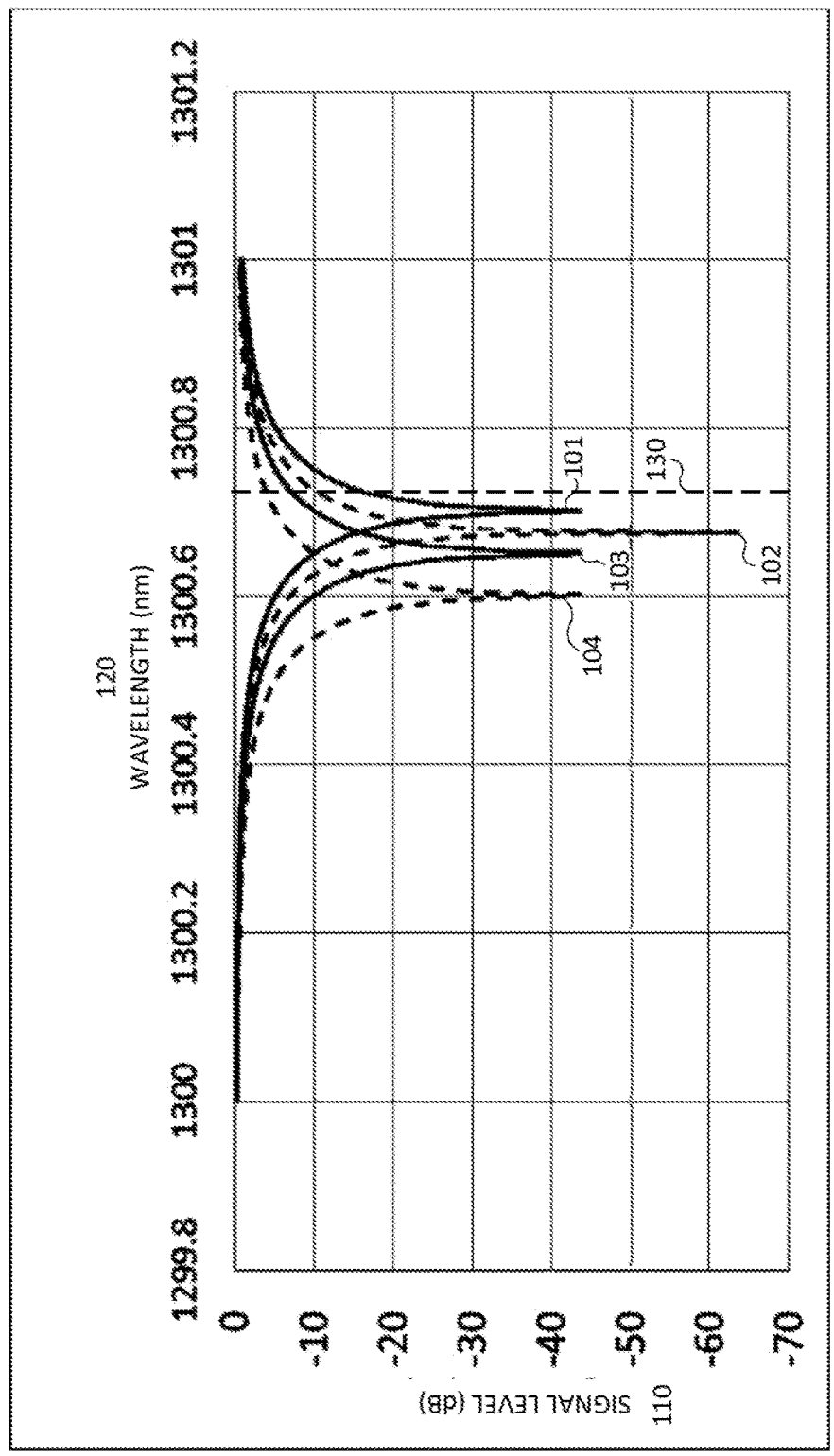
FIG. 1 is a graph of example transmission spectrums for a device of the present disclosure.

In one example, the present disclosure describes a device that may include a bus waveguide to carry light of a carrier wavelength, a first ring waveguide with a first modulator, a first heater to adjust a resonance wavelength of the first ring waveguide, and a second ring waveguide with a second modulator. In one example, the first ring waveguide and the second ring waveguide are coupled to the bus waveguide. In one example, the first modulator and the second modulator are to modulate the light of the carrier wavelength to impart one of at least four optical power levels to the light.

In another example, the present disclosure describes a device that may include a bus waveguide, a first ring waveguide with a first modulator, and a second ring waveguide with a second modulator. In one example, the first ring waveguide and the second ring waveguide are coupled to the bus waveguide and are to modulate light of a carrier wavelength to impart one of at least four optical power levels to the light.

In another example, the present disclosure describes a method of modulating light that may include providing the light having a carrier wavelength to a bus waveguide, modulating the light via a first ring waveguide, and modulating the light via a second ring waveguide. In one example, the modulating the light via the first ring waveguide comprises applying a first voltage to a modulator of the first ring waveguide to change a transmission spectrum of the bus waveguide, and the modulating the light via the second ring waveguide comprises applying a second voltage to a modulator of the second ring waveguide to change the transmission spectrum of the bus waveguide.

In accordance with the present disclosure, two integrated circuit (IC)-based ring waveguides, also referred to as ring resonators, ring resonator modulators, ring modulators, or simply "rings," are thermally tuned within resonance using at least one heat source, e.g., an embedded resistor. In one example, the two ring waveguides include modulators that use carrier-injection, e.g., forward-biased diodes, with NRZ encoded data at different optical extinction ratios to achieve at least a four-level (e.g., PAM-4) data encoding scheme.

In this approach, the data rate is double as compared to a single ring waveguide with a single modulator, while also reducing the power consumption needed for higher speeds of modulation. For example, PAM-4 data encoding for ring resonator modulators may be achieved using carrier depletion. In such case, pre-emphasis of the drive voltage may be unnecessary and PAM-4 encoding may be achieved using one ring alone. However, these rings are inherently larger in diameter, and thus have larger capacitance and increased footprint. In contrast, in accordance with the present disclosure, carrier injection enables smaller rings to be utilized due to a stronger modulation effect. In one example, a drive voltage with pre-emphasis may be used to achieve error-free transmission. In addition, the use of two ring waveguides in the present disclosure simplifies both the driver voltage and the thermal tuning, and maintains lower power consumption. Examples of the present disclosure may provide for data rates greater than 5 gigabaud per second (GBd/s), corresponding to 10 gigabits per second (Gb/s), where four-level encoding enables two symbols per cycle to be encoded.

In one example, a device of the present disclosure comprises a bus waveguide with two coupled ring waveguides. In one example, the ring waveguides have the same dimensions and are separated from the bus waveguide with the same gap spacing. For example, the ring waveguides may have outer diameters of approximately 5 microns, inner diameters of approximately 4.5 microns, and may be separated by a gap of approximately 325 nm from the bus waveguide, which may have a channel width of approximately 325 nm. It should be noted that the diameters of the ring waveguides may be made smaller where a wide spectral range is desired, and may be made larger where a narrower spectral range is desired. For example, the free spectral range (FSR) of one of the ring waveguides represents the separation between resonance wavelengths for that particular ring waveguide, which impacts the number of channels that may be multiplexed. The gap may determine the peak extinction ratio (ER) (which occurs at a wavelength that is defined as the resonance wavelength) and the quality factor (Q) of each ring waveguide. In one example, the Q of each ring waveguide is the same, and is greater than 5,000. In one example, the Q of each ring waveguide is greater than 9,000 to 10,000. In one example, a high Q, e.g., greater than 5,000, allows a clean output eye diagram to be obtained while using reasonable drive voltages, e.g., less than 2 volts. In one example, the channel dimensions and other channel properties of the two ring waveguides are also the same, e.g., the same channel width, the same channel height, the same cladding material, etc. In one example, resistive heaters are integrated into the ring waveguides, which allows for the resonance wavelengths of the respective ring waveguides to be tuned to within a few picometers resolution.

Examples of the present disclosure provide an advantage that the data rate is doubled as compared to two-level encoding, without having to modulate each channel at the higher data rate. This reduces the power consumption and complexity of CMOS driver design. Furthermore, the modulators providing the drive voltages do not need to be designed for higher modulation bandwidth, thereby extending the performance of the modulators designed for lower modulation bandwidths. In addition, static components may be used for signal amplification rather than current mode logic, which consumes a significant amount of power. These and other aspects of the present disclosure are described in greater detail below in connection with the example FIGS. 1-7.

FIG. 1 is a graph 100 of example transmission spectrums of an example device of the present disclosure. In one example, the present disclosure utilizes two ring waveguides with symmetric cavity Q and ER. In graph 100, the solid lines 101 and 103 represent the transmission spectrums associated with first and second ring waveguides in an "off" state, e.g., no voltage applied to a modulator, and hence no radio frequency (RF) bias applied to the ring waveguide. A first axis 110 represents a scaled optical power level (or intensity level) in decibels (dB), and a second axis 120 represents a wavelength of light, e.g., for a carrier signal traversing the bus waveguide. In one example, graph 100 represents ideal transmission spectrums, as viewed at the output of a bus waveguide. In particular, each of the transmission spectrums is shown as if there were only one bus waveguide and one ring waveguide. Should there be more than one ring waveguide coupled to the bus waveguide, the resulting optical output would be the sum of the individual curves in FIG. 1. As can be seen in FIG. 1, the maximum and minimum scaled power levels for curves 101 and 103 are the same, e.g., a maximum of 0 dB and a minimum of approximately −45 dB. In other words, the extinction ratios for the first and second ring waveguides are the same in the "off" state. The dashed lines 102 and 104 correspond to the shifted spectrums of the first and second ring waveguides when each of the respective ring waveguides is in an "on" state. In an "on" state, voltage is applied to a modulator, resulting in an RF signal, or RF bias, being applied to the respective ring waveguide.

It should be noted that the terms optical power and optical intensity may be used interchangeably for purposes of the present disclosure. However, it will be appreciated that optical intensity represents the optical power over a given cross-sectional area. As such, the optical intensity may be correlated to the optical power, e.g., given an optical intensity measured by a photodetector, and using known dimensions and/or other properties of the photodetector, the optical power may be calculated, and may have a linear relationship with respect to the optical intensity. The present disclosure is also primarily described in terms of wavelengths of light, e.g., sweeping the wavelength of an input signal, tuning the resonance wavelengths of ring waveguides, measuring the optical power level and/or intensity level of light of a particular wavelength, and so forth. However, it should be understood that the description of operations pertaining to a wavelength or wavelengths of light also necessarily include operations pertaining to a frequency or frequencies of light, insofar as the two parameters of wavelength and frequency of light have an immutable relationship.

In one example, due to the non-linear spectrums of the ring waveguides, the first ring waveguide, the second ring waveguide, or both, are tuned with respect to each other and with respect to the carrier signal wavelength to achieve as symmetric of an eye diagram as possible. For example, in the graph 100, the wavelength of the carrier signal is chosen at 1300.71 nanometers (nm), represented by the line 130. Two ring waveguides of the same dimensions, same materials, same gap width with respect to the bus waveguide, and so forth, should result in the same transmission spectrums when coupled to the bus waveguide. However, due to manufacturing variances and other factors, the two ring waveguides may deviate from theoretical equivalence. For instance, the resonance wavelengths of the respective ring waveguides (corresponding to peak attenuation of the carrier signal on the bus waveguide) may deviate from the wavelength of operation and/or from each other. In addition, the resonance wavelengths of the respective ring waveguides may be further separated from each other and/or from the operating wavelength, e.g., using embedded resistive heaters or other techniques to alter the resonance wavelength. For example, in the graph 100, it can be seen that in the "off" states, the first ring waveguide (curve 101) and the second ring waveguide (103) appear to have resonance wavelengths (e.g., peak resonance) at 1300.69 nm and 1300.62 nm, respectively. In one example, the two resonances of the ring waveguides may be detuned 60-100 picometers from each other to obtain optimal performance. In accordance with the present disclosure, the separation between curves 101 and 103 at the resonance wavelengths is referred to as the "resonance detuning," and the separation between curves 101 and 102, and between curves 103 and 104 at the resonance wavelengths is referred to as the "modulation amplitude," or "modulation strength," of a respective ring waveguide.

The attenuation of optical power imparted by each ring waveguide in the "on" state or the "off" state to a carrier signal at the wavelength of operation is given by the intersection by one of the respective curves 101-104 with the vertical line 130 at the selected wavelength of operation (e.g., 1300.71 nm). For example, the first ring waveguide in the "off" state (curve 101) will impart approximately a −16 dB attenuation to the optical power, while the first ring waveguide in the "on" state (curve 202), will impart approximately a −10 dB attenuation. Similarly, the second ring waveguide in the "off" state (curve 103) will impart approximately a −7 dB attenuation to the optical power, while the second ring waveguide in the "on" state (curve 104) will impart approximately a −4 dB attenuation. The four curves 101-104 in graph 100 illustrate example transmission spectrums where the first and second ring waveguides are individually coupled to the bus waveguide and are placed in the on and off states. However, in operation of a device of the present disclosure, the two ring waveguides will both interact with the carrier signal traversing the bus waveguide.

Thus, there are four possible states (e.g., of optical power level attenuation) that are comprised of combinations of the first and second ring waveguides being in the "on" or "off" state, respectively. In one example, Table 1 below shows the output power level as calculated by the summation of the relevant transmission spectrums. Although the two ring waveguides impart the same maximum ER in the "off" state, the attenuation, or extinction, on the carrier signal is different for each ring waveguide, as enabled by the choice of carrier signal wavelength and the detuning between the two ring waveguides in their off states.

TABLE 1

| State of Ring 1 | State of Ring 2 | Output at 1300.71 nm (dB) |
| --- | --- | --- |
| Off | Off | −33.2 |
| Off | On | −29.1 |
| On | Off | −21.9 |
| On | On | −17.7 |

Figure 2:
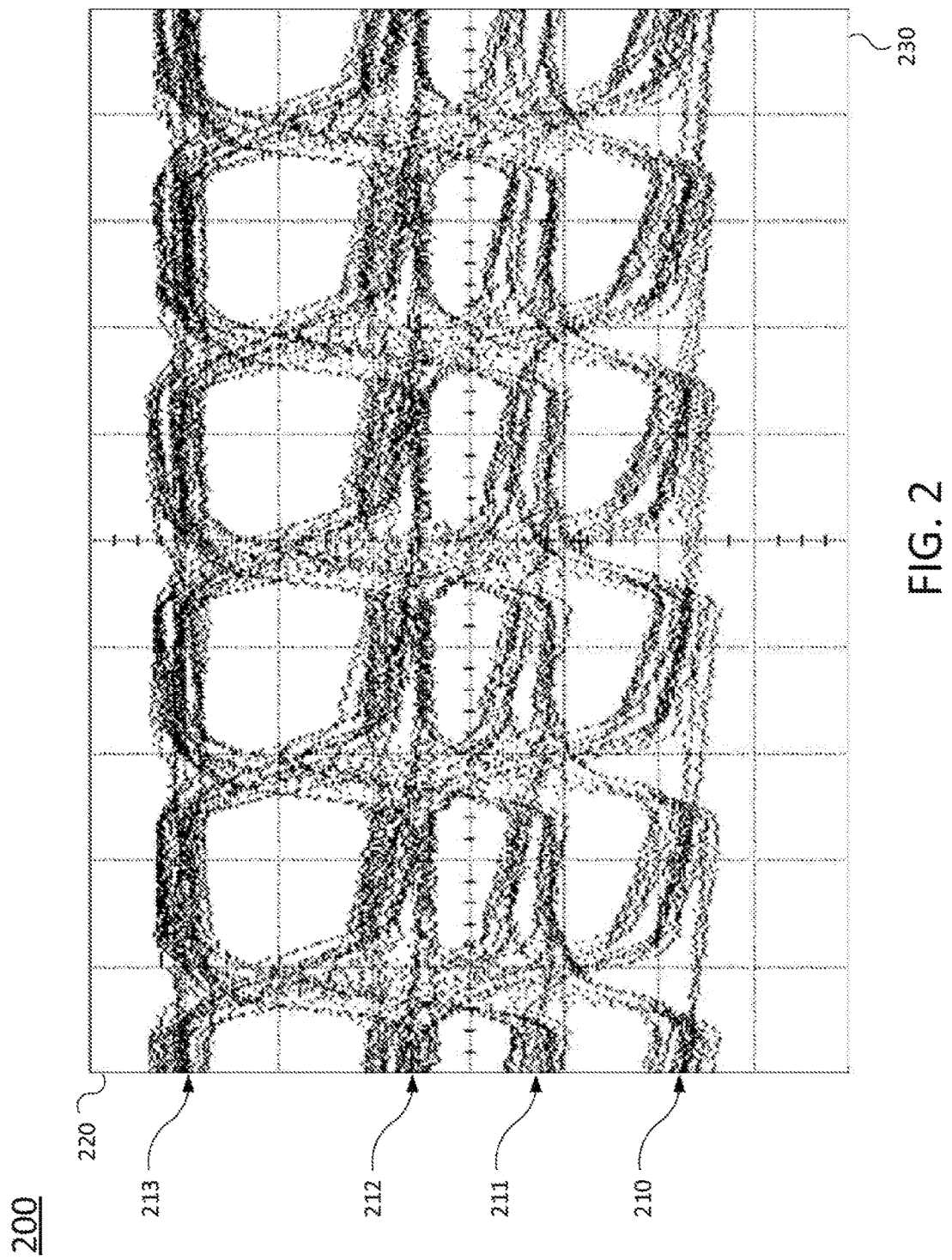
FIG. 2 is a graph comprising an example eye diagram of optical power level versus time for an example device of the present disclosure.

FIG. 2 illustrates an example eye diagram 200 for an output of a device of the present disclosure utilizing optical power levels for four-level encoding. e.g., PAM-4. A first axis 220 represents the optical power level (or optical intensity level) while the second axis 230 represents time. As can be seen in the eye diagram 200, there are four different levels of optical power, corresponding to four different attenuations that are achievable by setting two ring waveguides, e.g., ring waveguides 330 and 335 in FIG. 3, to different combinations of "on" or "off" states. The optical power levels 210-213 may correspond to the output power levels set forth in Table 1 above. For instance, optical power level 210 may correspond to maximum attenuation, where modulators of both ring waveguides are set to "off" states, e.g., −33.2 dB. Optical power level 211 may correspond to the modulator of the first ring waveguide being in an "off" state, while the modulator of the second ring waveguide is set to an "on" state, e.g., −29.1 dB. Optical power level 212 may correspond to the modulator of the first ring waveguide being in an "on" state, while the modulator of the second ring waveguide is set to an "off" state, e.g., −21.9 dB. Lastly, optical power level 213 may correspond to least attenuation, where modulators of both ring waveguides are set to "on" states, e.g., −17.7 dB. The non-linearity of the transmission spectrums is evidenced by the larger gap between optical power levels 212 and 213, as compared to the smaller gaps between optical power levels 210 and 211, and between optical power levels 211 and 212.

Figure 3:
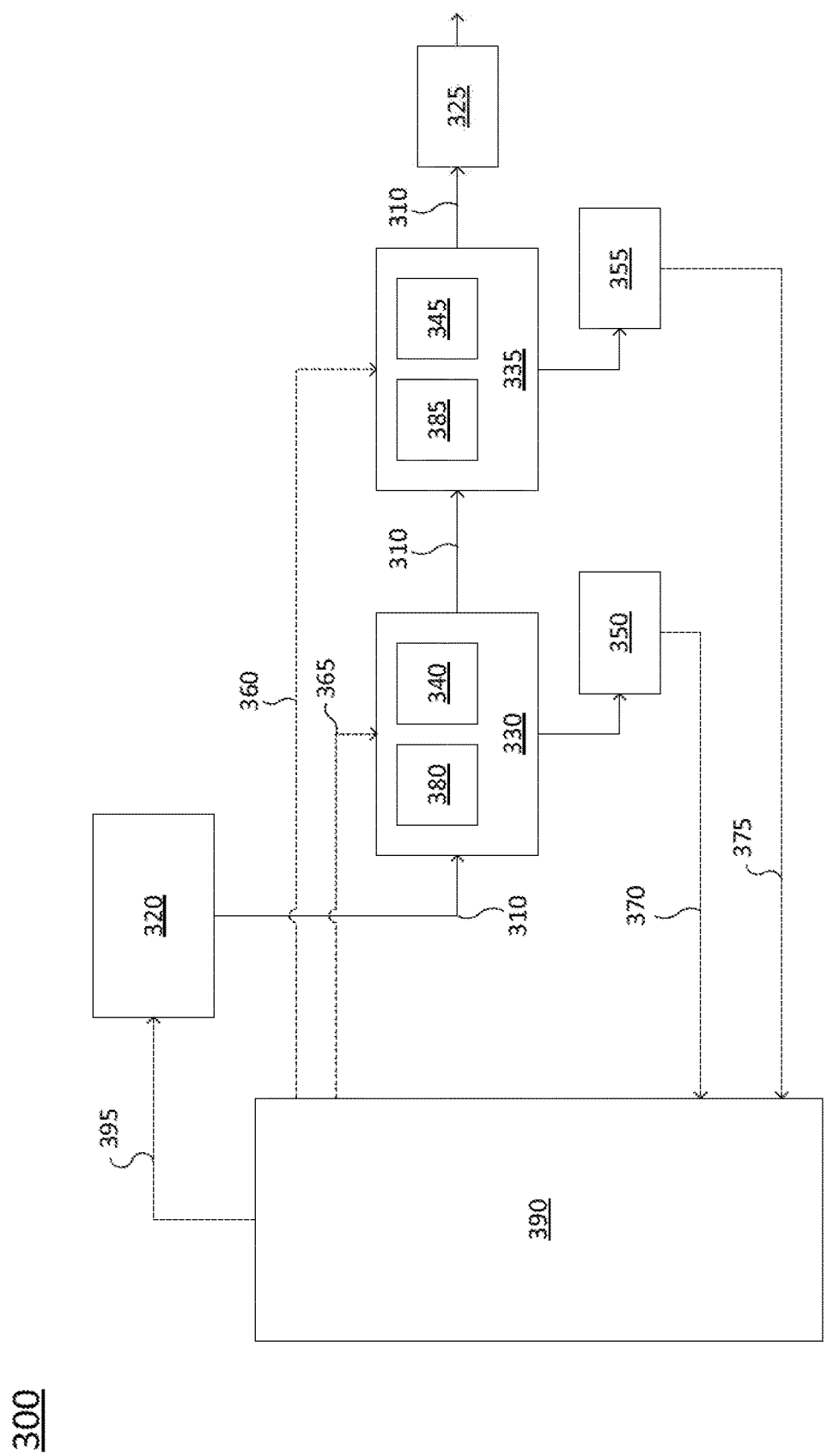
FIG. 3 illustrates an example device of the present disclosure.

FIG. 3 illustrates an example device 300 of the present disclosure. For instance, device 300 may comprise an integrated circuit (IC) having an optical carrier signal source 320, a bus waveguide 310, ring waveguides 330 and 335, and modulators 380 and 385. Device 300 may further include heaters 340 and 345 integrated in the ring waveguides 330 and 335, photodetectors 350 and 355, feedback lines 370 and 375, controls lines 360, 365, and 395, and a power monitor 325. In one example, device 300 may comprise a silicon-based IC.

In one example, optical carrier signal source 320 is for providing a carrier signal at a selected wavelength into the bus waveguide 310. Optical carrier signal source 320, broadly a "light source," may comprise, for example, a laser, a laser diode, a hybrid silicon laser, a light emitting diode (LED), or other solid-state or integrated circuit light source. In one example, optical carrier signal source 320 may be tunable, capable of generating light at various selected wavelengths, or may comprise a fixed-wavelength source. In another example, optical carrier signal source 320 may provide light of multiple discrete wavelengths. For instance, optical carrier signal source 320 may comprise a plurality of laser diodes, each generating light at a different discrete wavelength.

Ring waveguides 330 and 335 are coupled to bus waveguide 310. In one example, ring waveguides 330 and 335 have a same diameter, same channel dimensions, same cladding material, and so forth. For instance, the diameter of each of the ring waveguides 330 and 335 may comprise approximately 5 microns. In one example, ring waveguides 330 and 335 are separated from bus waveguide 310 by a same gap distance, e.g., approximately 300 nm. It will be appreciated that a portion of the light of the carrier signal(s) in the bus waveguide 310 will transfer to the ring waveguides 330 and 335, due to the transmission effect in the coupling regions between the bus waveguide 310 and the respective ring waveguides 330 and 335. The transmission effect is impacted by such things as the gap distances, the lengths of the coupling regions, and the refractive indexes between the bus waveguide and the ring waveguides 330 and 335.

The transmission effect is also wavelength-dependent. For instance, light at or near wavelengths corresponding to the resonance wavelengths of one of the respective ring waveguides 330 or 335 will more easily pass into the ring waveguide, while light of other wavelengths will not pass, or will only weakly pass into the ring waveguide. In other words, the optical intensity or optical power of light in the bus waveguide 310 at a resonance wavelength of one of the ring waveguides 330 or 335 will be attenuated due to the transmission effect and the passing of a portion of the light of that particular wavelength into the respective ring waveguide 330 or 335. It should be noted that although the resonant wavelengths of the ring waveguides 330 and 335 are detuned from one another, the resonant wavelengths are kept sufficiently close to a wavelength of the carrier signal, such that at least a measurable portion of the carrier signal is attenuated due to transmission of light of the carrier signal into both of the respective ring waveguides 330 and 335. For instance, in the graph 100 of FIG. 1, it can be seen that at the carrier wavelength of 1300.71, there is attenuation of optical power caused by both the first ring and the second ring in both the "on" and "off" states.

In one example, the tuning of resonance wavelengths of ring waveguides 330 and 335 is accomplished via one or both of heaters 340 and 345. The heaters 340 and 345 may be incorporated into the structures of the ring waveguides 330 and 335, and may each comprise a doped silicon region with metal contacts. For example, for each of the ring waveguides 330 and 335, the respective heater 340 or 345 may comprise a resistive heater created in the rib portion of the silicon, or other substrate, inside of the circumference of the ring waveguide. In one example, the length-to-width ratio of the resistor may be 2:1, as defined by the doping implantation.

A current in the range of 100-300 microamperes applied to one of the heaters 340 or 345, resulting in 5-7 volts across the heater, may be sufficient to achieve the desired detuning between the two ring waveguides 330 and 335 in their "off" states (without pre-emphasis, where there are no voltages applied to the modulators 380 and 385). The exact applied current value depends on the initial detuning of the two ring waveguides 330 and 335, and upon the specific heater on a particular ring waveguide. For instance, even though the ring waveguides 330 and 335 may be designed to have the same structure, due to fabrication variation, their resonances may already have some deviation.

Heat generated via one of the heaters 340 or 345 causes a red-shift in the resonance wavelength of the respective ring waveguide 330 or 335. In other words, as the temperature is increased, the resonance shifts to longer wavelengths. Therefore, in a two-ring example, if the ring waveguides 330 and 335 have different resonance wavelengths (e.g., in a "natural" or un-tuned state), the ring waveguide which has a resonance at a wavelength that is the shorter of the two may be selected for thermal tuning. However, in another example, either of the ring waveguides 330 or 335, or both of the ring waveguides 330 and 335 may be thermally tuned. For illustrative purposes, it is assumed that ring waveguide 330 has a resonance wavelength that is shorter with respect to ring waveguide 335, and therefore ring waveguide 330 will be thermally tuned to a desired resonance wavelength with respect to ring waveguide 335.

In order to achieve different extinction ratios (ERs) for the ring waveguides 330 and 335, the device 300 may first be calibrated. In one example, the calibration is performed by control circuit 390, e.g., in coordination with optical carrier signal source 320, heaters 340 and 350 and power monitor 325, e.g., a photodetector, which may be located at a through port of the device 300. For instance, the resonances of both ring waveguides 330 and 335 in an un-tuned and un-biased state may be quantified by sweeping a known, calibrated light source through a range of wavelengths. In one example, optical carrier signal source 320 may have the capability to provide the sweep of wavelengths, which may be initiated by a command from control circuit 390. Attenuations in the light output may then be observed at power monitor 325, e.g., with resonances appearing as local minimums in the received optical power, or intensity, versus wavelength. However, it may not be possible to assign one resonance dip to any specific ring waveguide. Therefore, a slight amount of current (e.g., 50-100 microamperes) may be applied to a heater 340 or 345 of one of the ring waveguides 330 or 335, and the wavelength sweep may be performed again. Comparing the two results of the sweeps, one resonance wavelength would have changed and therefore may be attributed to the ring waveguide that was thermally tuned.

As mentioned above, improved eye diagrams may result when the two resonances of the ring waveguides 330 and 335 are detuned 60-100 picometers from each other. Therefore, in one example, the optical carrier signal source 320 may be tuned to a wavelength that is approximately 60 picometers shorter with respect to the resonance wavelength of ring waveguide 335. In another example, e.g., under ideal conditions, the resonances of the ring waveguides 330 and 335 are detuned 50 picometers from each other. In one example, current may then be applied to the heater 340 of ring waveguide 330 until strong attenuation is observed in the output signal of the structure, e.g., at power monitor 325. The attenuation is attributable to ring waveguide 330, which has been thermally tuned to have a resonance wavelength equal to the wavelength of the light from optical carrier signal source 320 (and which is 60 picometers shorter in wavelength than the resonance wavelength of ring waveguide 335). An additional wavelength sweep from the optical carrier signal source 320, with current applied to heater 340, can confirm this configuration.

In the foregoing description, the output, as seen by power monitor 325, is used by the control circuit 390 to monitor the resonances of the two ring waveguides 330 and 335. However, in another example, the resonances may be measured via photodetectors 350 and 355 and provided to control circuit 390 for comparison. For example, photodetectors 350 and 355 may be integrated within the respective ring waveguides 330 and 335, and will only observe resonances of the associated ring waveguide. In one example, the photodetectors 350 and 355 are coupled to the ring waveguides 330 and 335 via drop ports, e.g., grating couplers. It should be noted that the optical output at the power monitor 325 has a high signal value (optical power and/or intensity) and drops to a lower value at or near the resonance wavelengths of the ring waveguides 330 and 335. In contrast, the currents from photodetectors 350 and 355 demonstrate low signal values except when the light from optical carrier signal source 320 is at or near the resonance wavelengths of the associated ring waveguide 330 or 335. For example, photodetector 350 will show zero signal (noise level) except when the light in bus waveguide 310 is a wavelength that is at or near the resonance wavelength of the ring waveguide 330. In other words, the current level is indicative of the optical intensity level (and power level) of light in the respective ring waveguide. Therefore, by using the integrated photodetectors 350 and 355, one step from the above tuning approach using power monitor 325 can be removed.

To illustrate, an additional tuning example may include wavelength-sweeping a known, calibrated light source, e.g., optical carrier signal source 320. The output currents of photodetectors 350 and 355 are monitored. If the ring waveguides 330 and 335 have different resonance wavelengths, each of the photodetectors 350 and 355 will show an increase in current at a different wavelength. Since it is known which photodetector (350 or 355) is associated with which ring waveguide (330 or 335), the resonance of each ring waveguide 330 and 335 may be more directly determined. In one example, the control circuit 390 may adjust one or both of the heaters 340 and 345 based upon the resonance wavelengths that are detected via photodetectors 350 and 355. When a desired resonance wavelength is observed for one or both of the ring waveguides 330 and 335 via the measurements of photodetectors 350 and 355, the control circuit 390 may end the thermal tuning process.

The calibration of device 300 may further include optimizing the drive voltages and pre-emphasis of the modulators 380 and 385. For instance, since the modulators used in devices of the present disclosure may operate in carrier injection mode, the voltages applied to the ring waveguides may include a pre-emphasis. In one example, the modulators may have a peak-to-peak voltage range of approximately 1.5 volts, with a pre-emphasis of approximately 0.6 volts (direct current (DC)). In one example, the peak-to-peak voltage and the pre-emphasis are the same for each modulator. For example, due to different extinction ratios (ERs), the corresponding changes in optical power level of the light of the carrier wavelength in the bus waveguide may be different, thereby allowing differentiation between optical power levels. For instance, referring to FIG. 2, optical power levels 211 and 212 reflect different extinction ratios, where only one or the other of the modulators is in the "on" state. However, in another example, these parameters may be individually set for each modulator to obtain a clean output eye diagram.

Once the device 300 is thermally tuned and any pre-emphasis and peak-to-peak voltages optimized, the device 300 may then be used operationally to encode and transmit data at four optical intensity levels. In one example, light of a carrier wavelength may be input to the bus waveguide 310 by the optical carrier signal source 320. First and second data streams may then be supplied to modulators 380 and 385 respectively, e.g., as applied voltages. In turn, the modulators 380 and 385 cause RF biases to be either applied or not applied to the ring waveguides 330 and 335 at each time period, e.g., per-clock cycle. When an RF bias is applied to one of the ring waveguides 330 or 335, it causes the transmission spectrum of the bus waveguide 310 to be changed. For example, more light from the bus waveguide 310 may be coupled into the ring waveguide when no bias is applied, causing greater loss of optical power from the bus waveguide 310 to the ring waveguide. However, when an RF bias is applied to a ring waveguide, e.g., ring waveguide 330, there may be less coupling between the bus waveguide 310 and the ring waveguide 330, causing more light and more optical power to remain in the bus waveguide 310, e.g., less loss of optical power from the bus waveguide 310. For example, FIG. 1 illustrates that there is less loss of optical power at the carrier wavelength according to curve 102 (e.g., ring waveguide 330 in the "on" state) as compared to curve 101 (e.g., ring waveguide 330 in the "off" state). When an RF bias is applied to both of the ring waveguides 330 and 335 at the same time, even more optical power remains in the bus waveguide 310.

Collectively, modulators 380 and 385 may impart one of four optical power levels (or optical intensity levels) to the light of the carrier wavelength in the bus waveguide 310. For instance, depending upon whether both of the modulators 380 and 385 are in an "off" state, modulator 380 is in an "on" state and modulator 385 is in an "off" state, modulator 380 is in an "off" state and modulator 385 is in an "on" state, or both of modulators 380 and 385 are in an "on" state, the transmission spectrum of the bus waveguide 310 may be altered, thereby imparting a loss of optical power to the light of the carrier wavelength in bus waveguide 310. At any given time, the loss of optical power may correspond to one of four optical power levels (or intensity levels) that is selectable based upon the data streams supplied to the modulators 380 and 385. A receiver circuit or other receiver device may therefore receive the light at the carrier wavelength, and recover the data stream based upon the optical power level (or optical intensity) that is detected. For example, as mentioned above, the modulators 380 and 385 may be driven by first and second data streams that are created from a source data stream. In one example, the first data stream may correspond to a most significant bit, while the second data stream may correspond to a least significant bit, where four symbols may be sent in any given time period. For instance, the optical power levels 210-213 in FIG. 2 may represent the symbols 00, 01, 10, and 11, respectively. In each symbol, the left-most bit may correspond to modulator 380 being in an "off" state, e.g., a zero, or in an "on" state, e.g., a one. The right-most bit may correspond to modulator 385 being in an "off" state, e.g., a zero, or in an "on" state, e.g., a one.

This foregoing is just one example of how binary data may be encoded by the four-level optical intensity encoding of the present disclosure, which may sometimes be referred to as four-level pulse amplitude modulation, or PAM-4. Thus, other examples may translate a source data stream into drive signals for the modulators 380 and 385 in a different manner. It should also be noted that since the modulators used in devices of the present disclosure may operate in carrier injection mode, the voltages applied to the ring waveguides may include a pre-emphasis. For instance, the modulators may have a peak-to-peak voltage range of approximately 1.5 volts, with a pre-emphasis of approximately 0.6 volts (direct current (DC)). Thus, the "off" state may comprise some applied positive (or negative) voltage. In one example, the peak-to-peak voltages and the pre-emphasis is the same for each modulator. However, in another example, these parameters may be individually set for each modulator.

It should be appreciated that the description of FIG. 3 is provided for illustrative purposes and that other, further and, different examples may be implemented in the same or a similar system. For instance, photodetectors 350 and 355, and the associated feedback lines 370 and 375 may be omitted, and calibration may be performed using power monitor 325. In another example, only one of the ring waveguides 330 or 335 may include a heater. In other words, one of heaters 340 or 345 may be omitted. In still another example, device 300 may not include power monitor 325. The power monitor 325 may be "off chip," for instance, where the other components of device 300 may comprise a transmitter. For example, the power monitor 325 may be in another chip of the same package, or in another location, e.g., in a receiver device.

In still another example, device 300 may include additional pairs of ring waveguides, e.g., a third ring waveguide and a fourth ring waveguide, a fifth ring waveguide and a sixth ring waveguide, and so forth. For example, each pair of ring waveguides may include pairs of respective modulators for providing four-level encoding to different carrier signals at different carrier wavelengths. Each pair of ring waveguides may include at least one heater for at least one of the ring waveguides in the pair, to enable tuning of the resonance wavelength. As such, a wavelength division multiplexing transmitter may be provided that is capable of utilizing multiple carrier signals having different wavelengths on the same bus waveguide. In one example, each carrier signal in such a transmitter may utilize at least a four-level encoding. However, in another example, the device may be capable of providing at least a four-level encoding on at least one carrier signal, while providing two-level encoding, e.g., OOK, NRZ—OOK, or the like on at least one other carrier signal. For instance, a pair of ring waveguides may be used to provide at least a four-level encoding to a first carrier signal at a first wavelength, while one waveguide with one modulator may be used to provide a two-level encoding to a second carrier signal at a second wavelength. In one example, the ring waveguides may be reconfigurable such that two ring waveguides that have been used to individually modulate carrier signals at two different wavelengths (e.g., using two-level encoding), may be paired together and used to collectively modulate a carrier signal using four-level encoding. It should be noted that greater than four optical power levels per carrier signal (e.g., per wavelength) may be achieved. In one example, an additional ring waveguide with an additional modulator to operate on light of the same carrier wavelength may be used. In another example, more than one modulator per ring waveguide may be used to operate on light of the same carrier wavelength. In still another example, the modulator of each ring waveguide may utilize voltages beyond simply the peak-to-peak "on" and "off" voltages.

It should also be noted that the scale of various components, the wavelengths of light that are utilized, and other features are provided by way of example. Thus, the present disclosure is not limited to any particular dimensions or operating parameters. In addition, variants of the above-disclosed and other features and functions, or alternatives thereof, may be omitted, or may be combined or altered into many other different systems or applications.

Figure 4:
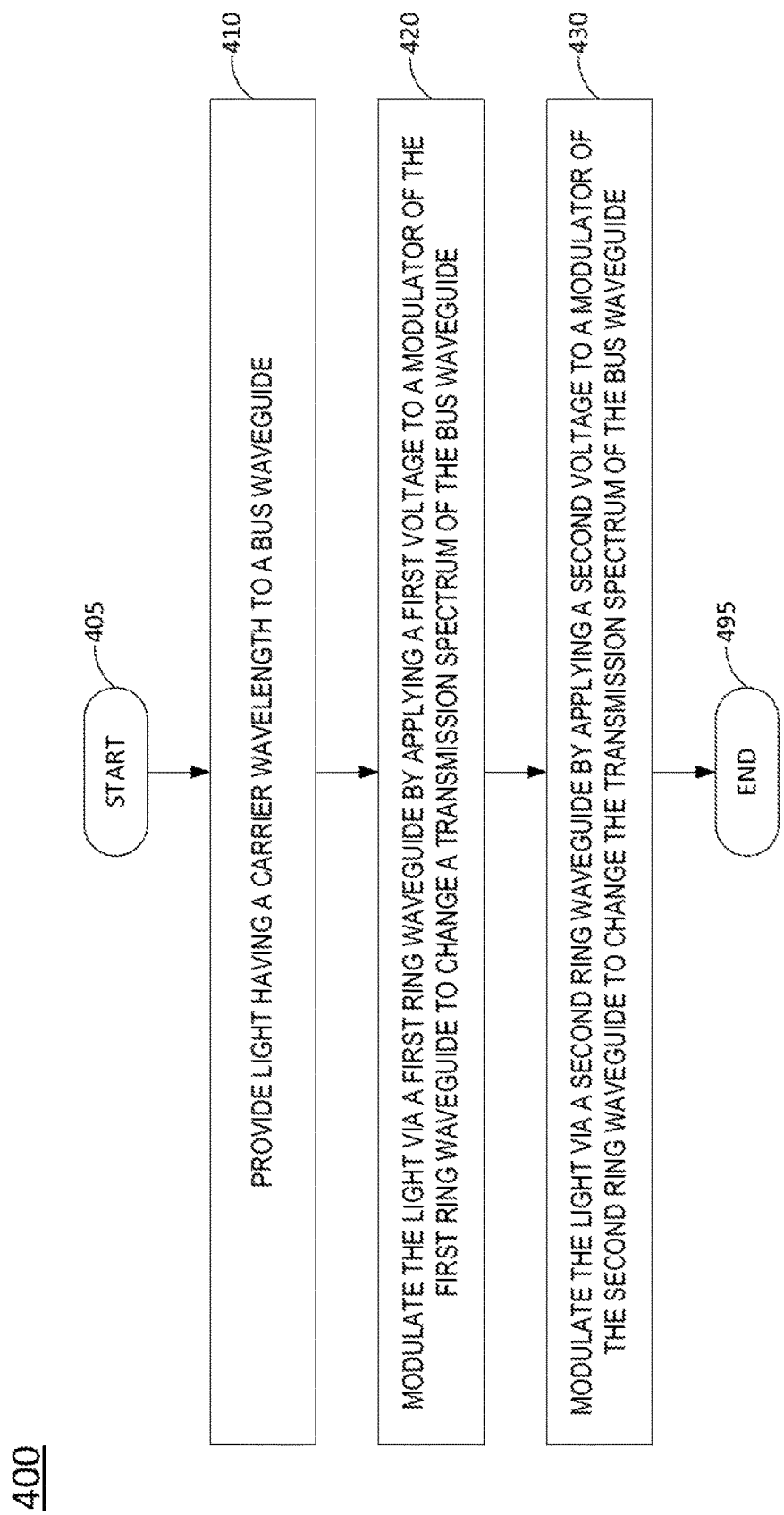
FIG. 4 illustrates a flowchart of an example method for modulating light.

FIG. 4 illustrates a flowchart of an example method 400 for modulating light. The method 400 may be performed, for example, by any one of the components of the system 300 of FIG. 3. For example, the method 400 may be performed by control circuit 390, or control circuit 390 in conjunction with at least one of the optical carrier signal source 320, ring waveguides 330 and 335, modulators 380 and 385, heaters 340 and 345, and so forth. Alternatively, or in addition, at least one of the blocks of the method 400 may be implemented by a computing device having a processor, a memory, and input/output devices as illustrated below in FIG. 6, specifically programmed to perform the blocks of the method. Although any one of the elements in system 300, or in a similar system, may be configured to perform various blocks of the method 400, the method will now be described in terms of an example where blocks of the method are performed by a processor, such as processor 602 in FIG. 6.

The method 400 begins in block 405 and proceeds to block 410. In block 410, the processor provides light having a carrier wavelength to a bus waveguide. For example, the processor may cause an optical signal source, such as a laser, a laser diode, a hybrid silicon laser, a light emitting diode (LED), or other integrated circuit light source to inject light at a discrete wavelength that is known and/or selected to the bus waveguide.

In block 420, the processor modulates the light via a first ring waveguide by applying a first voltage to a modulator of the first ring waveguide. In one example, applying the first voltage to the modulator of the first ring waveguide comprises an "on" state, which may result in an RF signal, or RF bias, being applied to the first ring waveguide. In turn, there may be a corresponding shift in the resonance wavelength of the first ring waveguide and a change in the transmission spectrum of the bus waveguide. For example, as mentioned above, the transmission effect between the bus waveguide and a ring waveguide is wavelength-dependent. Thus, when there is a shift in the resonance wavelength of the first ring waveguide, the transmission spectrum of the bus waveguide will also be altered. For example, light of the carrier wavelength in the bus waveguide will more or less easily pass into the first ring waveguide, depending upon whether or not there is an RF signal applied to the first ring waveguide. Thus, the optical power level of the light of the carrier wavelength in the bus waveguide may be altered, depending upon the quantity of light and optical power that is transferred into the first ring waveguide. In other words, there is a change in the transmission spectrum of the bus waveguide when the modulator is transitioned from an "off" state to an "on" state, and vice versa.

In block 430, the processor modulates the light via a second ring waveguide by applying a second voltage to a modulator of the second ring waveguide. In one example, applying the second voltage to the modulator of the second ring waveguide comprises an "on" state, which may result in an RF signal, or RF bias, being applied to the second ring waveguide. In turn, there may be a corresponding shift in the resonance wavelength of the second ring waveguide and a change in the transmission spectrum of the bus waveguide, in a similar manner to that which is described above in connection with block 420.

Following block 430, the method 400 proceeds to block 495 where the method ends.

Figure 5:
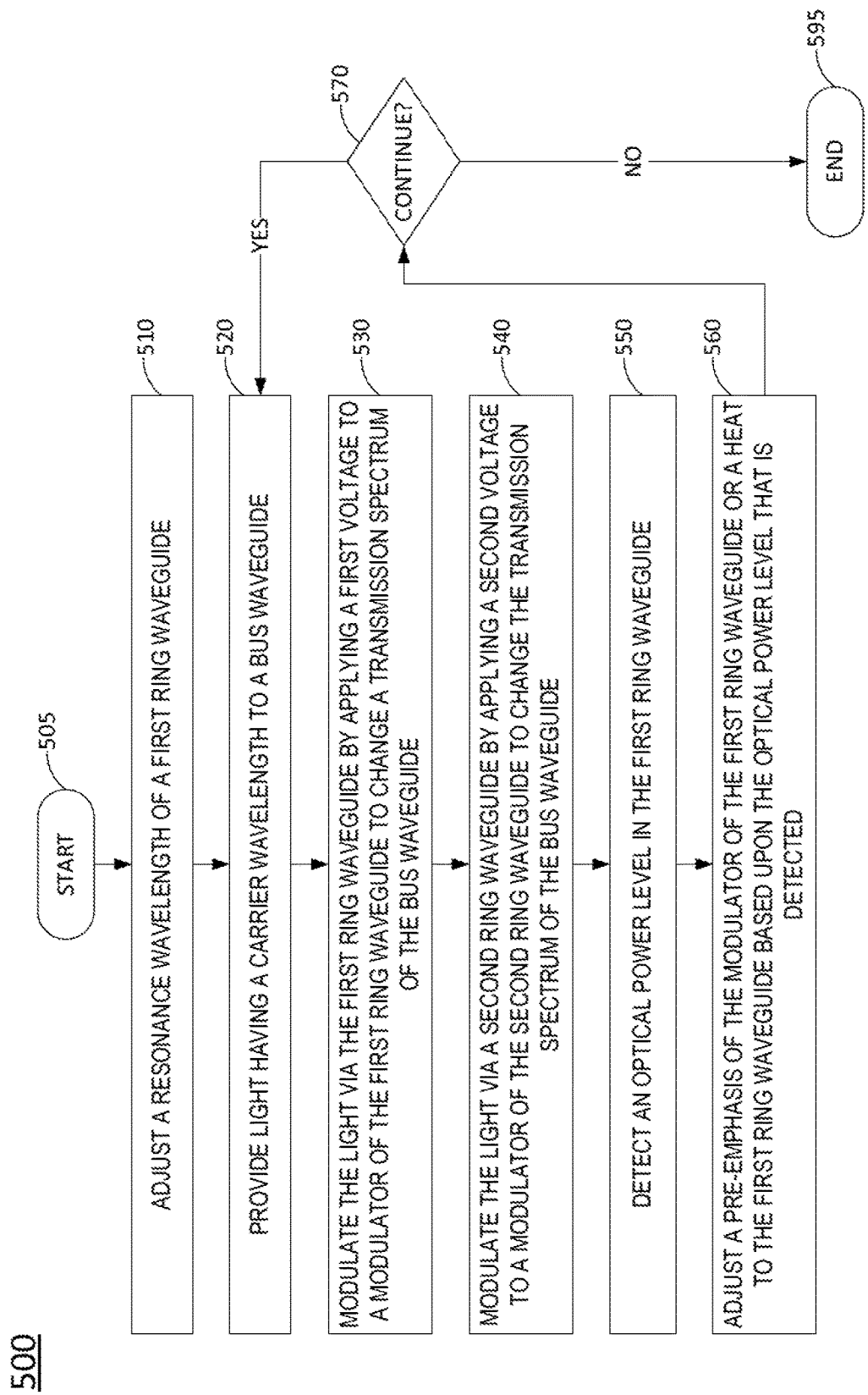
FIG. 5 illustrates a flowchart of an additional example method for modulating light.

FIG. 5 illustrates a flowchart of an additional example method 500 for modulating light. The method 500 may be performed, for example, by any one of the components of the system 300 of FIG. 3. For example, the method 500 may be performed by control circuit 390, or control circuit 390 in conjunction with at least one of the optical carrier signal source 320, ring waveguides 330 and 335, modulators 380 and 385, heaters 340 and 345, and so forth. Alternatively, or in addition, at least one of the blocks of the method 500 may be implemented by a computing device having a processor, a memory, and input/output devices as illustrated below in FIG. 6, specifically programmed to perform the blocks of the method. Although any one the elements in system 300, or in a similar system, may be configured to perform various blocks of the method 500, the method will now be described in terms of an example where blocks of the method are performed by a processor, such as processor 602 in FIG. 6.

The method 500 begins in block 505. In block 510, the processor adjusts a resonance wavelength of a first ring waveguide. In one example, the first ring waveguide may include a heater, such as an embedded resistor, which may be used as a heat source. An amount of heat from the heat source may provide a change in the resonance wavelength of the first ring waveguide. In one example, the resonance of the first ring waveguide is detuned 60-100 picometers from a resonance wavelength of a second ring waveguide. In one example, the resonance wavelengths of both the first and second ring waveguides are first determined by performing a wavelength sweep, and measuring the optical power level at a power monitor, as described above. In another example, optical power levels may be measured by photodetectors that are integrated with or coupled to the first and second ring waveguides in order to determine the respective resonance wavelengths for the first and second ring waveguides. In one example, after resonance wavelengths of both the first and second ring waveguides are determined, the resonance wavelength for the first ring waveguide may then be detuned from the resonance wavelength of the second ring waveguide, e.g., via heat from the heater. In one example, the processor may incrementally adjust the heat, e.g., via increasing current to the resistor, and measure a corresponding change in the resonance wavelength of the first ring waveguide, e.g., via a power monitor or via a photodetector of the first ring waveguide, until a target resonance wavelength is achieved.

In one example, the processor may also adjust the resonance wavelength of the second ring waveguide. For example, the resonance wavelength of the second ring waveguide may be adjusted in the same or a similar manner as the resonance wavelength of the first ring waveguide. For instance, the second ring waveguide may also have a heater, e.g., an embedded resistor that can be controlled as a tunable heat source, where the heat from the resistor may be used to change the resonance wavelength of the second ring waveguide. The second ring waveguide may further be coupled to a photodetector to measure incremental changes in the resonance wavelength as it is adjusted via the resistor.

In block 520, the processor provides light having a carrier wavelength to the bus waveguide. In one example, the light is input to the bus waveguide via a light source such as optical carrier signal source 320 described above. For instance, the processor may send instructions or otherwise control the light source to provide the light of the carrier wavelength. In one example, the carrier wavelength is between 50 and 100 nanometers longer or shorter than the resonance wavelength of the first ring waveguide.

In block 530, the processor modulates the light of the carrier wavelength in the bus using the first ring waveguide. In one example, the processor modulates the light of the carrier wavelength in the bus waveguide via the first ring waveguide by applying a first voltage to a modulator of the first ring waveguide. In one example, applying the first voltage to the modulator of the first ring waveguide comprises an "on" state, which may result in an RF signal, or RF bias, being applied to the first ring waveguide. In turn, there may be a corresponding shift in the resonance wavelength of the first ring waveguide and a change in the transmission spectrum of the bus waveguide. As the transmission spectrum of the bus waveguide is adjusted, a modulation may be imparted to the light of the carrier wavelength in the bus waveguide that is passing the first ring waveguide. For example, the optical power level of the light of the carrier wavelength passing the first ring waveguide may be changed, where different optical power levels encode different symbols of the modulation. In one example, block 530 may comprise the same or similar operations as described above in connection with block 420 of the method 400.

In block 540, the processor modulates the light of the carrier wavelength in the bus waveguide via the second ring waveguide by applying a second voltage to a modulator of the second ring waveguide. In one example, block 540 may comprise the same or similar operations as described above in connection with block 430 of the method 400. Block 540 may also comprise similar operations as described above in connection with block 530. For example, the light of the carrier wavelength in the bus waveguide may be modulated in a similar manner via both the first and second ring waveguides.

Collectively, the modulators in the first and second ring waveguides may impart one of four optical power levels (or optical intensity levels) to the light of the carrier wavelength in the bus waveguide. For instance, depending upon whether both of the modulators are in an "off" state, the modulator of the first ring waveguide is in an "on" state and the modulator of the second ring waveguide is in an "off" state, the modulator of the first ring waveguide is in an "off" state and the modulator of the second ring waveguide is in an "on" state, or both of modulators are in an "on" state, the transmission spectrum of the bus waveguide may be adjusted to one of four different states, thereby imparting one of four different losses of optical power to the light of the carrier wavelength in bus waveguide. At any given time, the loss of optical power may correspond to one of four optical power levels (or intensity levels) that is selectable based upon the data streams supplied to the modulators. As such, the light of the carrier wavelength in the bus may be modulated by the loss of optical power that is imparted via both the first and second ring waveguides.

In block 550, the processor detects an optical power level in the first ring waveguide. For example, the processor may receive feedback from a photodetector that is coupled to or integrated with the first ring waveguide. For instance, a current from the photodetector may be indicative of the optical power level (or the intensity) of light in the first ring waveguide.

In block 560, the processor adjusts an amount of heat to the first ring waveguide or adjusts a pre-emphasis of the modulator of the first ring waveguide based upon the optical power level that is detected. For example, RF modulation in forward bias for carrier injection may cause an increased average temperature, thereby causing deviations from an ideal eye diagram. A poor selection of pre-emphasis may also compound the degradation of the eye diagram. Thus, in one example, the amount of heat applied to the first ring waveguide or the pre-emphasis to the modulator may be adjusted based upon the optical power level that is detected. For instance, if the optical power level in the ring is expected to be 15 dB in the "off" state and 10 dB in the "off" state and it is determined at block 550 that the optical power levels are 14 dB and 9 dB, respectively, then the processor may adjust the modulator pre-emphasis, the heat provided by the heater, or both, in order to re-adjust the optical power levels. In one example, blocks 550 and 560 may further include, respectively, detecting an optical power level in the second ring waveguide, and adjusting an amount of heat applied to the second ring waveguide or a pre-emphasis of the modulator of the second ring waveguide based upon the optical power level that is detected.

In block 570, the processor determines whether to continue. If it is determined to continue, the method 500 may proceed back to block 520. Otherwise, if it is determined to not continue, the method 500 proceeds to block 595 where the method ends.

It should be noted that although not explicitly specified, at least one of the blocks, functions, or operations of the methods 400 and 500 described above may include storing, displaying, and/or outputting. In other words, any data, records, fields, and/or intermediate results discussed in the methods can be stored, displayed, and/or outputted to another device depending on the particular application. Furthermore, blocks, functions, or operations in FIGS. 4 and 5 that recite a determining operation, or involve a decision, do not necessarily imply that both branches of the determining operation are practiced. In other words, one of the branches of the determining operation can be deemed as optional.

Figure 6:
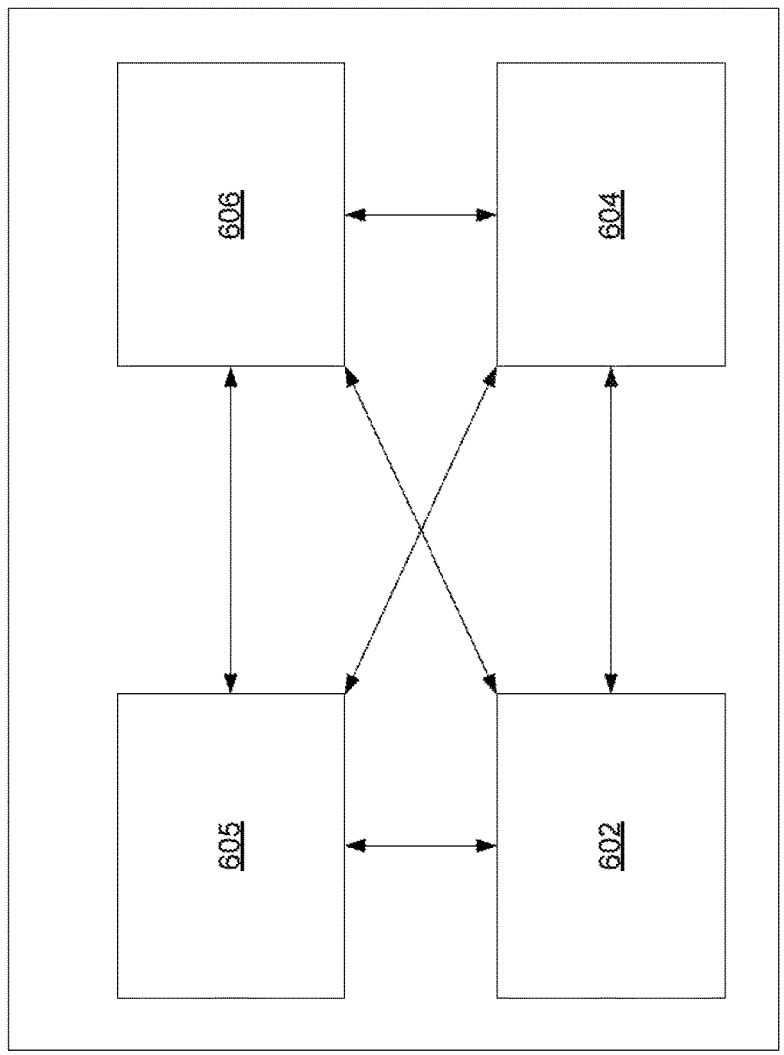
FIG. 6 depicts a high-level block diagram of an example computer that can be transformed into a machine to perform the functions described herein.

FIG. 6 depicts a high-level block diagram of a computing device suitable for use in performing the functions described herein. As depicted in FIG. 6, the computer 600 comprises a hardware processor element 602, e.g., a central processing unit (CPU), a microprocessor, or a multi-core processor, a memory 604, e.g., random access memory (RAM), a module 605 for modulating light, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 605 for modulating light, e.g., machine readable instructions, can be loaded into memory 604 and executed by hardware processor element 602 to implement the blocks, functions, or operations as discussed above in connection with the example methods 400 and 500. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for modulating light, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. A device comprising:
a bus waveguide to carry a light of a carrier wavelength;
a first ring waveguide communicatively coupled to a first modulator;
a first heater to adjust a first resonance wavelength of the first ring waveguide; and
a second ring waveguide communicatively coupled to a second modulator and having a second resonance wavelength, wherein at least one of the first resonance wavelength and the second resonance wavelength is offset from the carrier wavelength, wherein the first ring waveguide and the second ring waveguide are coupled to the bus waveguide, and wherein the first modulator and the second modulator are configured to modulate the light of the carrier wavelength to impart one of at least four optical power levels to the light;
wherein the first heater is configured to adjust the first resonance wavelength of the first ring waveguide to between 60 picometers and 100 picometers of the second resonance wavelength of the second ring waveguide.

2. The device of claim 1, wherein the first heater is to adjust the resonance wavelength of the first ring waveguide by applying a heat to the first ring waveguide.

3. The device of claim 1, wherein the first heater comprises a resistor embedded in the first ring waveguide.

4. The device of claim 1, further comprising:
a photodetector to detect an optical power level of the light in the first ring waveguide; and
a control circuit to control the first heater based upon the optical power level.

5. The device of claim 1, further comprising:
a second heater to adjust a resonance wavelength of the second ring waveguide to a different resonance wavelength than the resonance wavelength of the first ring waveguide.

6. The device of claim 1, further comprising:
a light source to input the light of the carrier wavelength to the bus waveguide.

7. The device of claim 1, wherein the first modulator and the second modulator comprise forward-biased diodes.

8. A method of modulating a light, the method comprising:
providing the light comprising a carrier wavelength to a bus waveguide;
modulating the light via a first ring waveguide, wherein the modulating the light via the first ring waveguide comprises applying a first voltage to a modulator of the first ring waveguide to change a transmission spectrum of the bus waveguide;
modulating the light via a second ring waveguide, wherein the modulating the light via the second ring waveguide comprises applying a second voltage to a modulator of the second ring waveguide to change the transmission spectrum of the bus waveguide; and
adjusting a resonance wavelength of the first ring waveguide via heat from a heater to between 60 picometers and 100 picometers from a resonance wavelength of the second ring waveguide.

9. The method of claim 8, wherein the modulating the light via the first ring waveguide and the modulating the light via the second ring waveguide impart one of at least four optical power levels to the light.

10. The method of claim 8, further comprising:
detecting an optical power level in the first ring waveguide; and
adjusting the heat to the first ring waveguide based upon the optical power level that is detected.

11. A device, comprising:
a bus waveguide;
a first ring waveguide communicatively coupled to a first modulator and a first heater, wherein the first ring waveguide is coupled to the bus waveguide; and
a second ring waveguide communicatively coupled to a second modulator, wherein the second ring waveguide is coupled to the bus waveguide, wherein the first modulator and the second modulator are configured to modulate a light of a carrier wavelength to impart one of at least four optical power levels to the light;
wherein the first heater is to adjust a resonance wavelength of the first ring waveguide to between 60 picometers and 100 picometers from a resonance wavelength of the second ring waveguide.

12. The device of claim 11, wherein the first ring waveguide and the second ring waveguide have dimensions that are the same, and wherein the first ring waveguide and the second ring waveguide have a same gap distance from the bus waveguide.

13. The device of claim 12, wherein the first modulator and the second modulator comprise forward-bias diodes, wherein the first modulator is to apply a first bias to the first ring waveguide when in an on state of the first modulator, and wherein the second modulator is to apply a second bias that is the same as the first bias to the second ring waveguide in an on state of the second modulator.

* * * * *